Figure 1:
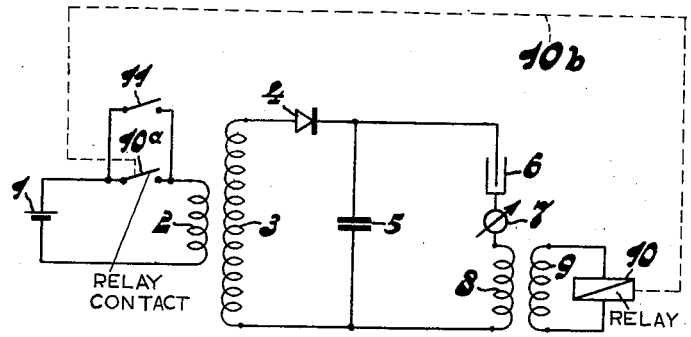

Sept. 25, 1956

G. HEPP 2,764,696

CIRCUIT-ARRANGEMENT FOR SUPPLYING ENERGY
TO A PULSATORY OPERATING DEVICE
Filed Oct. 21, 1952

INVENTOR

GERARD HEPP

BY

AGENT

United States Patent Office 2,764,696
Patented Sept. 25, 1956

2,764,696

CIRCUIT-ARRANGEMENT FOR SUPPLYING ENERGY TO A PULSATORY OPERATING DEVICE

Gerard Hepp, Eindhoven, Netherlands, assignor to Hartford National Bank and Trust Company, Hartford, Conn., as trustee Application October 21, 1952, Serial No. 315,956

Claims priority, application Netherlands December 21, 1951

3 Claims. (Cl. 250—83.6)

The present invention relates to a circuit arrangement for supplying energy to a pulsatory operating radiation detecting device. More particularly, the invention relates to a circuit-arrangement for feeding a load absorbing the energy in a pulsatory manner, more particularly, a Geiger-Müller tube, with the use of a source of low direct voltage, the supply voltage for the load being taken from a capacitor charged to a comparatively high voltage. The invention has for its object, in the first place, to minimize the consumption of energy of such a device, so that the source of direct voltage may be a battery, which is economical and occupies little space.

In the circuit-arrangement according to the invention a low direct voltage must be converted into a comparatively high direct voltage. If the low direct voltage is supplied from a battery, it may be of the order of 1.5 volts. For feeding a Geiger-Müller tube it must be converted into a voltage of a few hundred volts.

It is known to convert a low direct voltage into a high direct voltage by using a vibrator-converter which first converts the low direct voltage into an alternating voltage, which is raised by transformation and converted by rectification into a high direct voltage. Such a device constantly draws energy from the source of low direct voltage, even if no current is taken. It has also been suggested that Geiger-Müller tubes be fed by using a discharge tube comprising a control-grid, which operates transiently as an oscillator after a pulse has been produced in the Geiger-Müller tube. The voltage produced is increased by transformation and then rectified, the rectified voltage serving to charge a capacitor, from which the supply voltage for the Geiger-Müller tube is derived. Besides the fact that a comparatively high direct voltage is required to cause such a circuit-arrangement to operate, it is an additional disadvantage that, if no gas-filled tube comprising a cold cathode is used, filament current is constantly required for the cathode of the employed discharge tube comprising a control-grid.

The present invention is based on the recognition of the fact that by simple interruption of a circuit including an inductor the voltage pulse produced is high enough to charge a capacitor to a value such that it can supply the current required for a load absorbing the pulsatory energy.

The circuit-arrangement of the present invention comprises a relay which responds to the current pulses absorbed by the load and which completes a circuit which comprises the source of direct voltage and the primary winding of a transformer having a high transformation ratio. The secondary winding of said transformer is included in a circuit which comprises, moreover, a rectifying element and said capacitor, the arrangement being such that at the occurrence of a current pulse said capacitor is charged to a high voltage.

The high voltage must be maintained for a period of time in order to permit the device to supply the current required for the load at the occurrence of the next-following pulse. After the production of the pulse, the capacitor is re-charged and for a certain time it is again capable of supplying a pulsatory current. Leakage of the capacitor charge by way of the secondary winding of the transformer and the inadequate insulation resistor of the rectifier may be reduced by providing the relay with an additional contact, which keeps the circuit of the secondary winding of the transformer and the capacitor interrupted as long as the device is to be capable of responding. It is, however, more advantageous to include a vacuum diode as a rectifying element in the said circuit, said diode insuring not only that the capacitor is charged at the correct polarity, but also that undesired discharge of the capacitor is counteracted.

The relay may be an electromagnetic relay of conventional construction. However, the best results are obtainable with the use of a piezo-electric relay.

The device according to the invention need not be switched off, if it is not in use, since the current consumption is negligible. If, after a period of time, the capacitor charge leaks away, so that the supply voltage for the load fails, the only thing required is to complete transiently by hand the circuit of the primary winding of the transformer and the source of low voltage in order to produce a sufficiently high inductance pulse across the circuit of the secondary winding to charge the capacitor.

Figure 2:
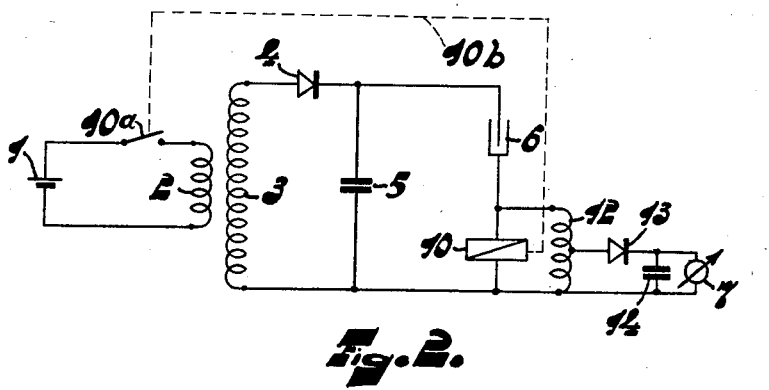

In order that the invention may be readily carried into effect, it will now be described in detail with reference to the accompanying drawing, wherein:

Fig. 1 is a schematic diagram of an embodiment of the circuit-arrangement of the present invention; and Fig. 2 is a modification of the embodiment of Fig. 1.

Fig. 1 is a circuit-arrangement for feeding a Geiger-Müller tube or load 6. The source of current is a battery 1, having a low voltage. The battery 1 is included in the circuit of a primary winding 2 of a transformer, this circuit may be completed by means of a relay contact 10a. The transformer has a high transformation ratio. A secondary winding 3 of the transformer is connected in series with a rectifying element 4 and a capacitor 5. In parallel with the capacitor 5 is connected the series combination of the Geiger-Müller tube 6, a meter 7 and a transformer winding 8. The winding 8 is coupled to a secondary winding 9, which feeds a sensitive relay 10. The secondary winding 9 of the transformer may be dispensed with if the connection is established through a tapping on the primary winding.

It is assumed that the capacitor 5 has a charge such that the voltage across its terminals suffices to produce a discharge in the Geiger-Müller tube 6, if ionization occurs therein. The current pulse thus produced causes the relay 10 to respond, so that the contact 10a is closed transiently. The fact that the contact 10a is operated by the relay 10 is indicated by a dotted line 10b which couples said relay to said contact. Then a current pulse is produced across the circuit 3, 4, 5, so that the capacitor 5 is recharged.

The rectifying element 4 must be of a type such that in the time intervals between two pulses substantially no charge of the capacitor 5 can leak away across the secondary winding 3 of the transformer. The rectifier 4 is preferably constituted by a vacuum diode. If desired, the relay 10 may be provided with a second contact which opens the circuit 3, 4, 5, if the contact 10a is also open. A contact 11, connected in parallel with the contact 10a, may be controlled manually and is provided to ready the device for use, if the charge of the capacitor 5 is designated for some reason or other.

Fig. 2 is a slightly modified circuit-arrangement. In Fig. 2, the meter 7 is connected in series with a crystal rectifier 13 and to part of a winding 12, included in the circuit of the tube or load 6. The relay 10 is connected in parallel with the winding 12. A capacitor 14 is connected in parallel with the meter 7. In this circuit-arrangement the pulse energy is used most effectively for the indication without the occurrence of troublesome oscillation phenomena.

It is to be understood that the invention is not limited to the details disclosed but includes all such variations and modifications as fall within the spirit of the invention and the scope of the appended claims.

What I claim is:

1. A circuit arrangement for supplying energy to a pulsatory operating radiation detecting device, said circuit arrangement comprising a capacitor, means coupling said capacitor to said detecting device thereby to energize said detecting device, a rectifying device, a transformer having primary and secondary windings and having a high transformation ratio, said secondary winding being coupled to said capacitor through said rectifying device, a source of direct voltage of low magnitude, relay means coupled to said detecting device and responsive to pulsatory current flow through said detecting device, and means for further coupling said relay means to alternately connect and disconnect said primary winding from said direct voltage source whereby at the occurrence of pulsatory current flow through said detecting device said capacitor is charged to a high voltage.

2. A circuit arrangement for supplying energy to a pulsatory operating radiation detecting device, said circuit arrangement comprising a capacitor, means coupling said capacitor to said detecting device thereby to energize said detecting device, a rectifying device, a transformer having primary and secondary windings and having a high transformation ratio, said secondary winding being coupled to said capacitor through said rectifying device, a source of direct voltage of low magnitude, relay means coupled to said detecting device and responsive to pulsatory current flow through said detecting device, and means for further coupling said relay means to alternately connect and disconnect said primary winding from said direct voltage source comprising relay actuated switch means connected between said primary winding and said direct current source whereby at the occurrence of pulsatory current flow through said detecting device said capacitor is charged to a high voltage.

3. A circuit-arrangement for supplying pulsatory energy to a Geiger-Müller tube, said circuit-arrangement comprising a first capacitor, a relay responsive to said pulsatory energy and having a winding and a switch actuated thereby, means connecting said tube serially to said winding across said capacitor, an auto-transformer having primary and secondary windings, said primary winding being connected across said relay winding, a first rectifying device, a meter connected serially to said rectifying device across said secondary winding, a second capacitor connected across said meter, a low direct voltage source, a second rectifying device, and a transformer having a first coil and a second coil and having a high transformation ratio; said first coil being connected across said direct voltage source through said switch, said second coil being connected across said first capacitor through said second rectifying device, whereby at the occurrence of each pulse of energy said first capacitor is charged to a high voltage.

References Cited in the file of this patent
UNITED STATES PATENTS

| 2,423,614 | Callighan et al. | July 8, 1947 |
| 2,435,515 | Rosser | Feb. 3, 1948 |
| 2,516,209 | Henninger | July 25, 1950 |
| 2,565,621 | Olson | Aug. 28, 1951 |
| 2,638,338 | Gould | Feb. 10, 1953 |